Dec. 11, 1962    G. F. ZIFFER    3,067,939
CONTROL SYSTEM
Filed Jan. 9, 1959    4 Sheets-Sheet 1

INVENTOR.
GARRET F. ZIFFER
BY
Joseph Weingarten
ATTORNEY

Dec. 11, 1962  G. F. ZIFFER  3,067,939
CONTROL SYSTEM
Filed Jan. 9, 1959  4 Sheets-Sheet 2

INVENTOR.
GARRET F. ZIFFER
BY
*Joseph Weingarten*
ATTORNEY

Dec. 11, 1962     G. F. ZIFFER     3,067,939
CONTROL SYSTEM

Filed Jan. 9, 1959                          4 Sheets-Sheet 3

POSITION

| OPERATION | 32 | 33 | 34 | 35 | 41 | 42 | 43 | 44 | 45 | 46 | 64* |
|---|---|---|---|---|---|---|---|---|---|---|---|
| INTEGRATION | a | a | a | a | a | a | a | a | a | a | a |
| AVERAGING | b | b | b | b | a | a | a | a | a | a | b |
| RESET | b | b | b | b | b | b | b | b | b | b | b |

\* IN FIG. 5 CIRCUIT ONLY

FIG. 4

*INVENTOR.*
GARRET F. ZIFFER
BY
*Joseph Weingarten*
ATTORNEY

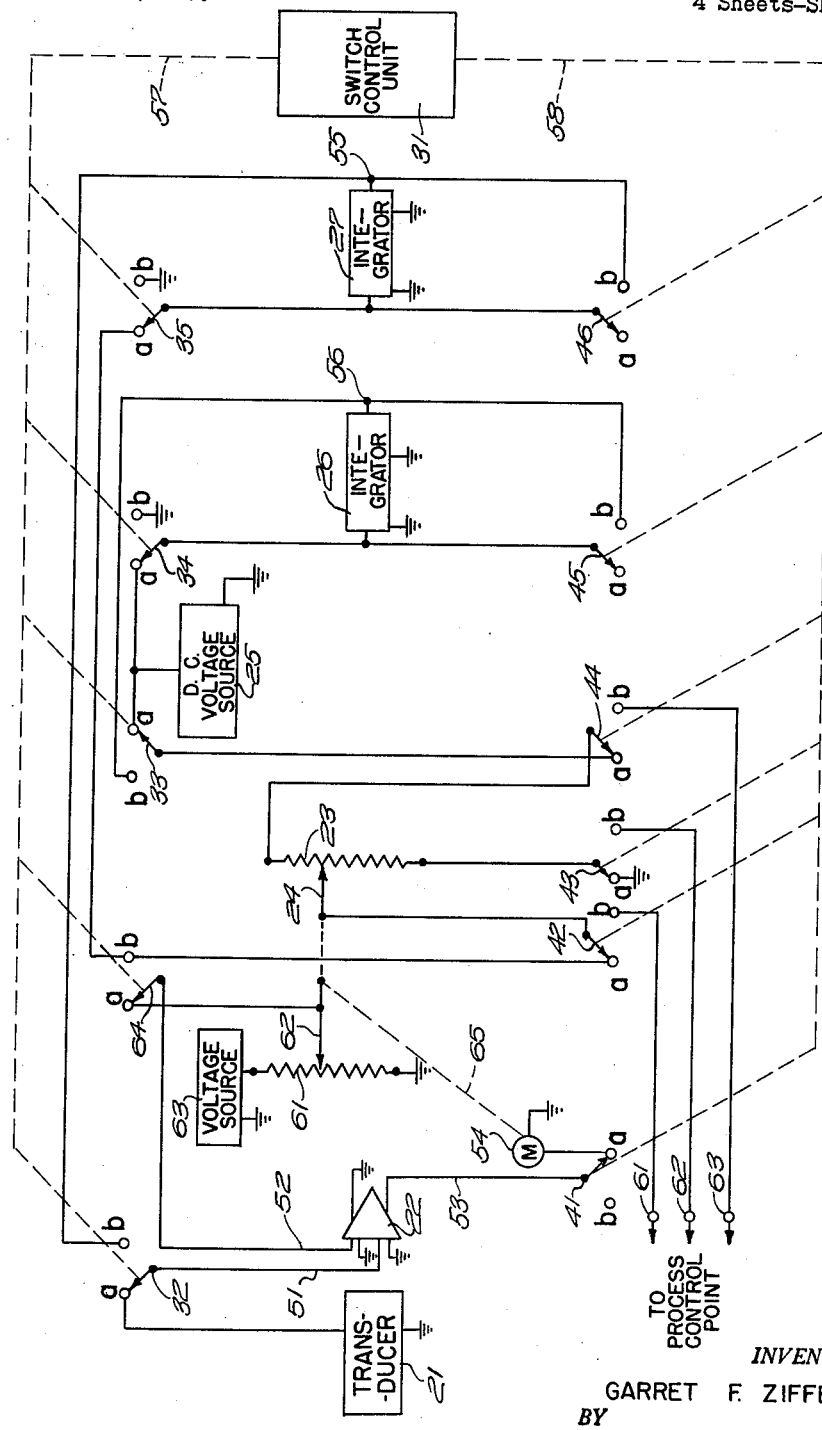

United States Patent Office 3,067,939
Patented Dec. 11, 1962

3,067,939
CONTROL SYSTEM
Garret F. Ziffer, Wayland, Mass., assignor, by mesne assignments, to Laboratory For Electronics, Inc., Boston, Mass., a corporation of Delaware
Filed Jan. 9, 1959, Ser. No. 785,956
4 Claims. (Cl. 235—183)

This invention relates in general to process control equipment, particularly to a means for periodically obtaining the average value of the output of a transducer measuring some physical parameter of the process for control purposes.

The techniques of automation have been applied over a wide range of commercial activities, and have yielded particularly fruitful results in the area of process control. The essentials of a process control are the measurement of variation of some element in the process and subsequent feedback of this information to a point from which this element of the process can be controlled. The adaptation of electronic techniques to this operation has resulted in more precise control, consequently attaining more rigid adherence to a preconceived pattern of variation in the element.

As an example, in the manufacture of goods such as sheets of rubber, plastic, paper, and steel, an important dimension is the thickness of the product. It is generally desirable to maintain this thickness at a constant value; however, variations in the raw material as well as in the process machinery tend to cause excessive variations in thickness unless dynamic control is applied. Since deviation from desired thickness is generally more critical if it is in the direction of a smaller thickness, the tendency has been to run such material at somewhat over the optimum thickness. However, the use of a continuous process control in this type of operation has resulted in eliminating this practice and therefore, in great economies in manufacturing.

In automated process control a great many transducers have been employed; however, the use of a radioactive gauge head system has met with a great deal of success in many industries, for example, paper manufacturing. In this application a radiation head containing a radiation emitter and detector provides an electric signal proportional to the thickness of the paper passing underneath it, since the amount of radiation absorbed is a function of the mass of paper interposed between the source and detector. Because the width of the paper sheet may be several feet while the width of the area to be inspected at any given moment by the transducer head is more likely to be a few inches, provision is made to scan with the transducer head across the width of the paper. Variation in calender rolls or feed mechanism often causes variation in thickness of the paper from one side of the strip to the other. This variation from side to side is not readily controlled by the control means, hence, to control the thickness in the direction of sheet travel it is desirable to measure the average thickness across the paper and feed this information back for continuous control of the strip. While the average value of a variable $x$ may be expressed as $$\bar{x} = \frac{\int_0^T x\, dt}{T}$$

in the past only the integral $$\int_0^T x\, dt$$

has been used for this purpose. To use this assumes a constant time of integration and accounts for no variation in strip width or scanning speed.

It is the primary object of this invention to provide a compact, rapid, and accurate apparatus for process control employing feedback of the true average value.

It is another object of this invention to provide an apparatus capable of recording the transducer output, storing its integrated value, and providing an indication of its true average value, suitable for control purposes.

It is the further object of this invention to provide a three-step, high-speed average computer in which errors due to non-linearity, variation of D.C. voltage, and drift are considerably reduced.

These and other objects will become apparent from the following description when taken in conjunction with the accompanying drawing in which:

FIG. 4 is a tabulation of switch positions;

FIG. 5 is a block diagram partly in schematic form of a second embodiment of an average computer for use in a process control system.

Figure 1:
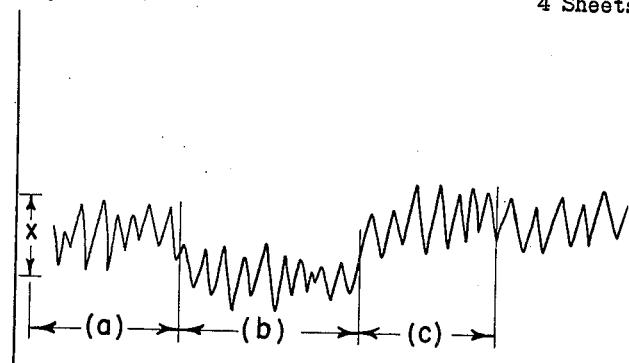
FIG. 1 illustrates a typical signal tracing from a radiation gauge transducer.

With reference now to FIG. 1, the tracing of a beta gauge transducer output is illustrated. As can be seen, it represents a plot of voltage amplitude vs. time. Two types of variation are present in this trace, one variation being that included within section marked (2) where the average value for the period ($a$) is constant but variations having an amplitude approximately ($x$) are occurring around this average value. A second longer term variation is also indicated in which the average itself is varying, an example of this being the variation between sections ($a$), ($b$), and ($c$). The short term variations such as those indicated entirely within the bracket ($a$) may be due to a variety of factors, such as cocked calender rolls or unevenly set dies on an extruder. These variations may be of a fixed nature and hence it is not desirable to feed back information pertaining to them to the control point which can exert no influence on them; however, the longer term variation such as that indicated between sections ($a$), ($b$), ($c$), is that variation which the process control system seeks to eliminate. Thus, in order to maintain the process as constant as possible it is desirable to apply information at the control point indicative of the long term trend, but not containing the repetitive short cycle variations, as these latter tend to reduce the overall effectiveness of the process control. While the plot in FIG. 1 is an illustrative example of one particular condition, it will be understood that many analogous situations arise in which it is desirable to ignore the fine structure of the variation while maintaining close control over the broad trends.

In its most general form the present invention provides a means for integrating the transducer output signal variations for a predetermined period of time. The duration of this time need not be repetitively constant but rather may be determined by a separate mechanism, such as limit switches indicating the beginning and end of a single scan across a process strip. A means is also provided for obtaining a voltage proportional to the elapsed time during the same period, coupled with a means for dividing the integrated value of the transducer signal by this integrated value proportional to time for that given period. The quotient is then provided as an output, suitable for control purposes, which output represents the true average value of the transducer output signal over the period. If only the integrated value of signal amplitude is used for control information, errors are introduced when variations not associated with the process itself occur, such as a variation in the speed of the scanning mechanism or a change in the width of the sheet.

Figure 2:
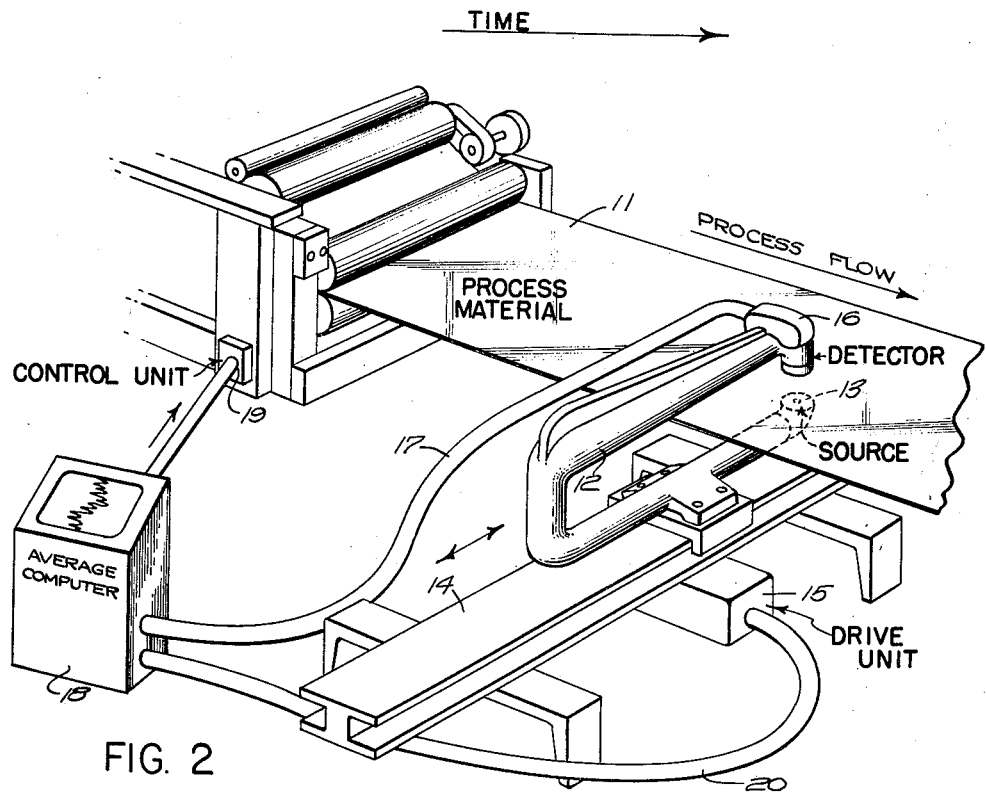
FIG. 2 is an illustration partly in perspective and partly in schematic form of a typical radiation gauge process control system.

Turning now to FIG. 2 there is illustrated a process control system in accordance with this invention. A process material 11 is seen to flow through the jaws of a transducer 12, the transducer being a radiation thickness gauge in which the radiations from source 13 pass through the process material to detector head 16, which provides as an output a voltage proportionate to the amount of radiation detected. The relative absorption of these radiations is a function of the thickness of the process material, hence the output voltage is proportional to the thickness also. The transducer is seen to be slideably mounted on a carrying beam 14 and is scanned transversely across the process material by means of drive unit 15. Limit switches located in detector head 16 indicate both the beginning and end of the material strip width. This information together with the signal representing absorption data on the process material is coupled through line 17 to average computer 18. This average computer will be described in more detail below. In general, however, the computer determines the average value of the transducer signal for a period corresponding to the time required for the transducer to scan across the process material strip, this time being indicated by the information from the limit switches. The average value is then fed to control point 19 on the process line. A timing unit (not shown) in the average computer establishes a delay equivalent to that required for the progress of material from the control point to the transducer and then sends a signal through line 20 to the drive unit 15 to initiate a new scan cycle. In this manner the transducer measures the thickness of the material strip, sends this information to the average computer which calculates the average value and sends the average value to the control point, at which point the process is altered to compensate for variation in the material which has been indicated by the transducer. At a time after this correction has taken place the transducer again scans the material, again feeds its signal to the average computer, which again feeds the average to the control point. Thus a continuing sequence of measurement, correction, measurement is maintained, and through this effective process control is achieved.

Figure 3:
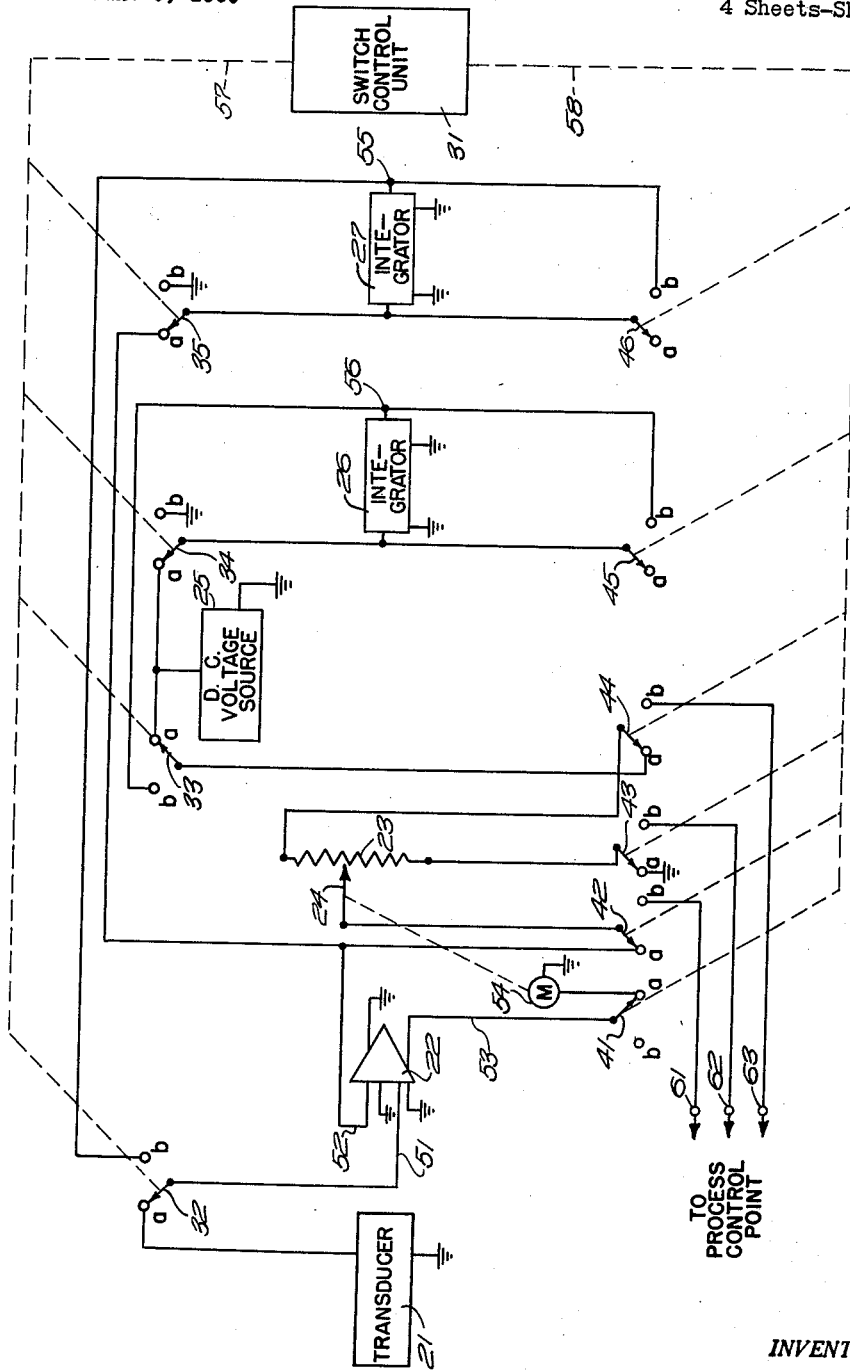
FIG. 3 is a block diagram partly in schematic form of an average computer for use in such a process system.

With reference now to FIG. 3, an average computer circuit in accordance with principles of this invention is illustrated. The major circuit components consist of a transducer 21, a comparator amplifier 22 having a motor drive output 53, a servo motor 54, a slide wire potentiometer 23 with a movable center arm 24, a direct current voltage source 25, an integrating operational amplifier 26, and a second integrating operational amplifier 27.

The computation of the average value of the transducer 21 output is accomplished in three sequential steps. The three steps are integration, averaging, and reset. Each step utilizes a particular combination of the above described circuit elements, which combinations are attained by means of two banks of switches operated from a switch control unit 31. Thus, referring to FIG. 3, switches 32, 33, 34, and 35 are seen to comprise one bank, and as indicated by the dotted lines, the switches in this bank are operated in conjunction at a signal from the control unit 31. In the drawing the switches are indicated in the position for step 1, integration, and at a signal from the control unit 31, all four switches would be switched to their opposite position. Switches 41, 42, 43, 44, 45, and 46 comprise the second bank which are operated, as indicated by the dotted lines, in conjunction with one another, but independently of the switches in the first bank. A separate signal from control unit 31 actuates this group of switches. This second bank is also shown in the position for the first step, integration.

FIG. 4 is a tabulation indicating the switch positions for each step for all of the switches.

The operation of this circuit can best be described by considering each of the three operational steps separately.

Integration

In the integration cycle the transducer 21, which may be any transducer capable of translating a physical parameter into a voltage signal, is connected through switch 32 to one input terminal 51 of amplifier 22. A second input 52 of this amplifier is electrically coupled through switch 42 to movable arm 24 to potentiometer 23. The output 53 of amplifier 22 is coupled through switch 41 to motor 54. This motor is mechanically coupled to arm 24 of potentiometer 23. Potentiometer 23 is grounded at one end through switch 43 and at the other end is coupled electrically through switches 44 and 33 to direct current voltage source 25. Amplifier 22 operates in such a manner that output 53 is generated whenever there is a voltage imbalance between inputs 51 and 52, the polarity of the signal and hence the direction of motor 54 drive being dependent on whether input 51 voltage exceeds that of input 52 or whether the situation is reversed. Since arm 24 is electrically coupled to input 52, the overall operation is one of creating on arm 24 a voltage equal to that generated at input 51 from transducer 21.

Arm 24 is also coupled electrically through switch 42 and switch 35 to the input of integrator 27 which is adapted to provide as its output the integral with time of its input signal. It can be seen that this quantity which appears at junction 55 is not, in this step, electrically coupled to any other point. D.C. voltage source 25 is electrically coupled through switch 34 to the input of integrator 26, which is again adapted to provide as its output the integral with time of its input. Here again in this step the output which occurs at junction 56 is not coupled electrically to any other point. The overall operation during this step, then, is such as to generate at output 56 the integral of D.C. source 25 with time, and at output 55 the integral with time of the signal from transducer 21. The duration of this step is determined, as indicated above, by means which would be located in switch control unit 31, such as limit switches or the like.

Averaging

When the period for which the average is to be computed is completed, control unit 31 sends a signal along line 57 to switches 32, 33, 34, and 35; which changes the position of these switches to the contact indicated by the letter (b) terminating the integration step and initiating the averaging step. Tracing the circuit after these switching actions it is seen that the inputs of integrators 26 and 27 are now grounded through switches 34 and 35 respectively. This fixes their outputs at the value which obtained at the instant when switching occurred. Transducer 21 is now isolated from the rest of the circuit and input 51 of comparator amplifier 22 is now electrically coupled through switch 32 to the "fixed" output of integrator 27. Input 52 of amplifier 22 remains electrically coupled to arm 24 of the potentiometer. One end of the potentiometer remains grounded through switch 43 while the opposing end is now coupled through switches 44 and 33 to the output 56 of integrator 26. The action of comparator 22 in this step serves to generate on arm 24 a voltage equal to the output voltage of integrator 27.

The output of integrator 27 represents the integral with respect to time of the transducer variable for the period of integration. This may be written $$\int_0^T x\, dt$$

where T is the integration period and $x$ is the transducer variable. The potential applied across potentiometer 23 is the integral of D.C. voltage with respect to time for this time period, which may be expressed as $$\int_0^T V\, dt$$

If it is assumed that V, the D.C. voltage remains constant the integral becomes VT. If we let $f=$ the fraction of potentiometer 23 voltage appearing on arm 24, then the condition of the apparatus in this step can be described by the equation $$fVT = \int_0^T x \, dt$$

or $$fV = \frac{\int_0^T x \, dt}{T}$$

which is the average value of $x$.

Reset

When the potentiometer arm 24 comes to rest, the average value has been determined and it only remains to provide this average value as a usable output and to reset the circuit to its initial condition. Since the time required for averaging is only a few seconds, this period is controlled by a timer (not shown) located in the control unit 31. The timer is initiated at the beginning of the averaging cycle. It times out after a time interval which is adjusted to be a few seconds longer than that required for the computation. The timer then initiates a signal through line 58 to switches 41, 42, 43, 44, 45, and 46. The contact arms on these switches are now changed to the position indicated by the letter b on FIG. 3. Under these conditions arm 24 and both ends of potentiometer 23 are isolated by switches 42, 43, and 44, from the remainder of the circuit. Arm 24 and each end of potentiometer 23 are then brought out at points 61, 62, and 63 to serve as an output signal indicating the average value. The same switching operation shorts out the output of integrators 26 and 27 by virtue of shorting switches 45 and 46, and since the inputs of integrators 26 and 27 remain grounded from the previous cycle the output is effectively reduced to zero, since the integrators are operational amplifiers with capacity feed back. Switch 41 isolates output 53 of amplifier 22 from motor 54, thus preventing any transient imbalance at inputs 51 and 52 from varying the position of arm 24 during this step.

A second timer (not shown) which may be located in switch control unit 31 may be set to create a delay, as above mentioned, to compensate for the lag of material flow from control point to transducer. At the end of this delay, it initiates a signal down both lines 57 and 58, returning both banks of switches to their original (a) position. This action initiates a second cycle of the integration stage and so a second computing cycle to determine another average.

In FIG. 5, a second embodiment of an average computing circuit is shown, in which like numbers refer to like parts of FIG. 3. In this embodiment a second potentiometer 61 has a voltage source 63 coupled across it. The movable center arm 62 of potentiometer 61 is mechanically coupled to arm 24 of potentiometer 23. An additional switch 64 is placed in the bank of switches containing switches 32, 33, 34, and 35. In the integration cycle switch 64 electrically couples arm 62 of potentiometer 61 to input 52 of amplifier 22. Output 53 of amplifier 22 again actuates motor 54 through switch 41; however in this embodiment motor 54, through mechanical linkage 65, drives arm 62 of potentiometer 61 as well as arm 24 of potentiometer 23. Thus, in the integration cycle, the comparator 22 operates to produce on arm 62 a voltage equal to the transducer 21 output voltage. Since in this embodiment arm 24 on potentiometer 23 is a mechanical slave of arm 62, its position on the potentiometer 23 is proportionate to the variations of signal from transducer 21, but the voltage which appears on 24 is entirely independent of the magnitude of voltage associated with transducer 21.

In the averaging cycle new switch 64 acts to provide the same circuit arrangement which was present in the embodiment shown in FIG. 3 in that arm 24 is electrically coupled to input 52 of the comparator and new potentiometer arm 62 is electrically isolated from the remainder of the circuit. The remainder of the averaging step as well as the reset step now goes as before, with the exception that upon initiating a new cycle, switch 64 again establishes the circuit as depicted in FIG. 5.

The advantages of this configuration lie particularly in the fact that a voltage may be selected for D.C. source 25 irrespective of the expected values of voltage from transducer 21. Since in this embodiment, the relative position of arm 24 on potentiometer 23 is used to indicate the variation in transducer 21 signal the use of the same potentiometer in both the integration and averaging steps as well as the use of the identical D.C. voltage source 25 for both time integration and as a power source across potentiometer 23 means that variations in the voltage level with time and non-linearity in the recording slide wire tend to cancel out. This is so because these variations appear in both numerator and denominator when the division is accomplished. It should also be noted that using the embodiment shown in FIG. 5, a transducer whose output is mechanical in nature can be coupled to arm 24 which will then translate the variation in its position into a voltage variation which will be integrated in integrator 27.

While the invention has been described above in terms of a particular circuit configuration and as it appears in a particular process control mechanism, it is apparent that it should not be limited to this alone. But rather it is suitable for any process application wherein it is desirable to obtain the average value of a physical variable for periods of time. In view of the fact, therefore, that numerous modifications and departures may now be made by those skilled in the art, the invention herein should be construed as limited only by the spirit and scope of the appended claims.

What is claimed is:

1. Apparatus for computing the average value of a physically expressed variable comprising a potentiometer having a movable arm, means for translating the said physically expressed variable into position of said arm on said potentiometer, a direct current voltage source coupled across said potentiometer, a first integration circuit coupled electrically to said direct current voltage source, said first integration circuit being adapted to provide as an output the integral with time of said direct current voltage, a second integration circuit coupled electrically to said movable arm and adapted to provide as an output the integral with time of the voltage appearing on said arm, means including said potentiometer for dividing the output of said second integration circuit by the output of said first integration circuit, and means for indicating the quotient of said division as the position of said arm on said potentiometer.

2. Apparatus for computing the average value of a physically expressed variable for a period of time comprising, means for determining the duration of the period and providing a time signal at the end of said period, a slide wire potentiometer having a movable arm, means for translating said physically expressed variable into position of said arm on said slide wire potentiometer, a direct current voltage source coupled across said slide wire potentiometer, a first integration circuit coupled electrically to said direct current voltage source and adapted to provide as an output the integral with time of said direct current voltage, a second integration circuit coupled electrically to said arm on said slide wire potentiometer and adapted to provide as an output the integral with time of voltage appearing on said arm, circuit means for fixing the outputs of said first and said second integration circuits in response to said time signal occurring at the end of said time period, means responsive to said time signal for decoupling said direct current voltage source from said potentiometer, means responsive to said time signal for decoupling said slide wire arm from said physical variable, means responsive to said time signal for coupling said fixed output of said first integration circuit across said slide wire potentiometer, a balancing amplifier having first and second input terminals which operates to produce a motor drive output when there is a difference in voltage amplitude at each of said first and second terminals, means responsive to said time signal for coupling electrically said fixed output of said second integration circuit to said first input terminal, means responsive to said time signal for coupling electrically said potentiometer arm to said second input terminal, means for mechanically linking said motor drive to said potentiometer arm such that the voltage on said arm is made equal in amplitude to said fixed output of said second integration circuit, the final position of said arm on said slide wire representing the true average value of said physical variable for the said time period ending at said time signal.

3. Apparatus for computing the average value of a physically expressed variable for a period of time comprising, a potentiometer having a movable arm; means for translating the said physically expressed variable into position of said arm on said potentiometer; a direct current voltage source coupled across said potentiometer; a first integration circuit coupled electrically to said direct current voltage source, said first integration circuit being adapted to provide an output voltage related to the integral with time of said direct current voltage; a second integration circuit having its input coupled electrically to said movable arm and adapted to provide as an output a voltage related to the integral with time of the voltage appearing on said arm; means operative at the conclusion of said period for fixing the outputs of said first and second integration circuits, means operative at the conclusion of said period for decoupling said potentiometer and arm from said direct current voltage source and said second integration circuit input respectively; means operative at the conclusion of said period including said potentiometer for dividing the output of said second integration circuit by the output of said first integration circuit, and means for indicating the quotient of said division as the position of said arm on said potentiometer.

4. Apparatus for computing the average value of a variable voltage signal for a period of time comprising, timer means adapted to provide a time signal at the end of said period; a potentiometer having a movable arm; a source of D.C. voltage coupled across said potentiometer; a balancing amplifier having first and second input terminals and a motor drive output, said balance amplifier being adapted to actuate said motor drive output in response to a voltage difference between said first and second input terminals; said variable voltage signal being coupled to said first input terminal, said movable arm being electrically coupled to said second input terminal, the position of said arm on said potentiometer being controlled by said motor drive output; first integration means coupled to said D.C. voltage source and adapted to provide as an output a voltage related to the integral with time of said voltage from said D.C. voltage source; second integration means coupled electrically to said movable arm and adapted to provide as an output a voltage related to the integral with time of voltage appearing on said arm; means operative in response to said time signal for fixing the outputs of said first and second integration circuits; means responsive to said time signal for switching said first input terminal of said balancing amplifier from said variable voltage to the output of said second integration circuit; means operative in response to said time signal for decoupling said D.C. voltage source from said potentiometer and said movable arm from said second integration circuit; means responsive to said time signal for coupling said output of said first integration circuit across said potentiometer.

References Cited in the file of this patent

UNITED STATES PATENTS

| | | |
|---|---|---|
| 1,971,238 | Silling | Aug. 21, 1934 |
| 2,455,035 | Bode | Nov. 30, 1948 |
| 2,540,807 | Berry | Feb. 6, 1951 |
| 2,627,372 | Razek | Feb. 3, 1953 |
| 2,740,300 | Strother | Apr. 3, 1956 |

OTHER REFERENCES

Hornfeck: Proc. of the AIEE, July 1952, page 188; 235–193.

Russell et al.: Control Engineering, February 1956, page 21; 235–184.